(12) United States Patent
Saito et al.

(10) Patent No.: US 9,708,194 B2
(45) Date of Patent: Jul. 18, 2017

(54) DENSE LAYERED DOUBLE HYDROXIDE, AND METHOD FOR PRODUCING SAME

(71) Applicant: NGK INSULATORS, LTD., Nagoya-Shi (JP)

(72) Inventors: Naomi Saito, Nagoya (JP); Megumi Fujisaki, Nagoya (JP); Kazuyuki Matsuda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/696,731

(22) Filed: Apr. 27, 2015

(65) Prior Publication Data

US 2015/0225252 A1 Aug. 13, 2015

Related U.S. Application Data

(63) Continuation of application No. PCT/JP2014/056121, filed on Mar. 10, 2014.

(30) Foreign Application Priority Data

Mar. 25, 2013 (JP) .................. 2013-061451
Sep. 27, 2013 (JP) .................. 2013-201088

(51) Int. Cl.
*C01F 7/00* (2006.01)
*C01G 1/02* (2006.01)
(Continued)

(52) U.S. Cl.
CPC .............. *C01F 7/005* (2013.01); *C01G 1/02* (2013.01); *C04B 35/44* (2013.01); *C04B 35/64* (2013.01);
(Continued)

(58) Field of Classification Search
CPC ... C01F 7/005; C01F 7/00; C01G 1/02; C01P 2002/72; C01P 2006/10; C01P 2006/60;
(Continued)

(56) References Cited

U.S. PATENT DOCUMENTS 6,028,023 A 2/2000 Vierheilig
2009/0214819 A1 8/2009 Tomita

FOREIGN PATENT DOCUMENTS

JP 2001-520162 A1 10/2001
JP 2003-038959 A1 2/2003
(Continued)

OTHER PUBLICATIONS

Parvulescu, A. N., et al. "Telomerization of 1, 3-butadiene with biomass-derived alcohols over a heterogeneous Pd/TPPTS catalyst based on layered double hydroxides." ACS Catalysis 1.5 (2011): 526-536.*

(Continued)

*Primary Examiner* — Richard M Rump
(74) *Attorney, Agent, or Firm* — Burr & Brown, PLLC

(57) ABSTRACT

The present invention provides and produces a high-grade layered double hydroxide (LDH) dense body having a relative density of 88% or greater in a simple and stable manner. The present invention provides a LDH dense body including a layered double hydroxide as a main phase and having a relative density of 88% or greater, the LDH being represented by general formula: $M^{2+}_{1-x}M^{3+}_{x}(OH)_2 A^{n-}_{x/n}\cdot mH_2O$ wherein $M^{2+}$ is a divalent cation, $M^{3+}$ is a trivalent cation, $A^{n-}$ is an n-valent anion, n is an integer of 1 or greater, and x is 0.1 to 0.4. This LDH dense body can be produced by compacting and firing a raw material powder of a LDH to obtain an oxide fired body, retaining this oxide fired body in or immediately above an aqueous solution comprising an n-valent anion to reproduce the LDH, and removing excessive water from the resulting water-rich LDH solidified body.

15 Claims, 6 Drawing Sheets

(51) Int. Cl.
*C04B 35/44* (2006.01)
*C04B 35/64* (2006.01)

(52) U.S. Cl.
CPC ...... *C01P 2002/22* (2013.01); *C01P 2002/72* (2013.01); *C01P 2002/84* (2013.01); *C01P 2002/88* (2013.01); *C01P 2004/03* (2013.01); *C01P 2004/20* (2013.01); *C01P 2004/62* (2013.01); *C01P 2006/10* (2013.01); *C01P 2006/40* (2013.01); *C01P 2006/60* (2013.01); *C04B 2235/3206* (2013.01); *C04B 2235/442* (2013.01); *C04B 2235/77* (2013.01); *C04B 2235/9653* (2013.01)

(58) Field of Classification Search
CPC .............. C01P 2004/62; C01P 2004/03; C01P 2002/88; C01P 2006/40; C01P 2002/84; C01P 2004/20; C01P 2002/22
See application file for complete search history.

(56) References Cited

FOREIGN PATENT DOCUMENTS

| | | | |
|---|---|---|---|
| JP | 2003-225566 | A1 | 8/2003 |
| JP | 2010-005901 | A1 | 1/2010 |
| WO | 2008/044497 | A1 | 4/2008 |
| WO | 2010/109670 | A1 | 9/2010 |

OTHER PUBLICATIONS

Khusnutdinov, V. R., and V. P. Isupov. "Mechanochemical synthesis of layered double Mg—Al hydroxides." Chem. Sustain. Dev. 15 (2007): 367-372.*

Tadanaga, Kiyoharu, et al. "Effect of Mg/Al ratio on hydroxide ion conductivity for Mg—Al layered double hydroxide and application to direct ethanol fuel cells." Journal of the Electrochemical Society 159.4 (2012): B368-B370.*

English Translation of the Written Opinion, International Application No. PCT/JP2014/056121, dated Jun. 25, 2015 (11 pages).

Extended European Search Report (Application No. 14772709.3) dated Dec. 16, 2015.

European Office Action (Application No. 14772709.3) dated Oct. 31, 2016.

G. Parthasarathy et al., "*Pressure-Induced Phase Transitions of Hydrotalcite by Electrical Resistivity, Structural and Thermal Studies*," Microporous and Mesoporous Materials, 2002, vol. 56, pp. 147-152.

International Search Report and Written Opinion (Application No. PCT/JP2014/056121) dated Apr. 22, 2014 (with English translation).

Japanese Office Action (Application No. 2014-530994) dated Oct. 8, 2014 (with English translation).

\* cited by examiner

DENSE LAYERED DOUBLE HYDROXIDE, AND METHOD FOR PRODUCING SAME

CROSS-REFERENCE TO RELATED APPLICATIONS

This application is a continuation application of PCT/JP2014/056121 filed Mar. 10, 2014, which claims priority to Japanese Patent Application No. 2013-061451 filed Mar. 25, 2013 and Japanese Patent Application No. 2013-201088 filed Sep. 27, 2013, the entire contents all of which are incorporated herein by reference.

BACKGROUND OF THE INVENTION

1. Field of the Invention

The present invention relates to a layered double hydroxide dense body and a method for producing the same.

2. Description of the Related Art

Layered double hydroxides (hereinafter referred to as LDHs) represented by hydrotalcite are a group of substances having exchangeable anions between hydroxide layers and are used as, for example, catalysts and adsorbents, as well as dispersing agents in polymers for enhancement of heat resistance, by taking advantage of their characteristics. In recent years, LDHs have been attracting attention as materials that conduct hydroxide ions, and addition to the electrolyte of an alkaline fuel cell or the catalyst layer of a zinc air battery has been also studied. For example, Patent Document 1 (WO2010/109670) proposes the use of a membrane of a layered double hydroxide as an alkaline electrolyte membrane of a direct alcohol fuel cell.

In light of conventional areas of application such as catalysts, a large specific surface area is required, and it is therefore sufficient to synthesize and use LDHs in a powder form. On the other hand, in light of application to an electrolyte that takes advantage of hydroxide ion conductivity in alkaline fuel cells or the like, densities of LDHs are important for preventing fuel gasses from mixing and obtaining a sufficient electromotive force.

Although layered double hydroxides have been attracting attention in recent years as hydroxide ion conductors, it is impossible to densify LDHs by firing because LDHs are hydroxides, and LDHs are thus mostly synthesized as powder. Therefore, in the present circumstances, the electrolyte of a conventional alkaline fuel cell is assessed using a pressed powder obtained merely by packing a LDH powder. In fact, the alkaline electrolyte membrane disclosed in Patent Document 1 as well is merely a pressed body obtained by compacting a hydrotalcite powder into pellets by a cold press. Accordingly, there is a demand for a simple technique for stably obtaining a layered double hydroxide represented by hydrotalcite in a sufficiently dense form.

CITATION LIST

Patent Document

Patent Document 1: WO2010/109670

SUMMARY OF THE INVENTION

The inventors have currently found that it is possible to provide and produce a high-grade layered double hydroxide dense body having a relative density of 88% or greater in a simple and stable manner.

Accordingly, an object of the present invention is to provide and produce a high-grade layered double hydroxide dense body having a relative density of 88% or greater in a simple and stable manner.

According to an aspect of the present invention, there is provided a layered double hydroxide dense body comprising a layered double hydroxide as a main phase and having a relative density of 88% or greater, the layered double hydroxide being represented by the general formula:

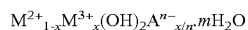

$$M^{2+}_{1-x}M^{3+}_{x}(OH)_2 A^{n-}_{x/n} \cdot mH_2O$$

wherein $M^{2+}$ is a divalent cation, $M^{3+}$ is a trivalent cation, $A^{n-}$ is an anion having a valency of n, n is an integer of 1 or greater, and x is 0.1 to 0.4.

According to another aspect of the present invention, there is provided a method for producing a layered double hydroxide dense body, comprising the steps of:

providing a raw material powder of a layered double hydroxide represented by the general formula:

$$M^{2+}_{1-x}M^{3+}_{x}(OH)_2 A^{n-}_{x/n} \cdot mH_2O$$

wherein $M^{2+}$ is a divalent cation, $M^{3+}$ is a trivalent cation, $A^{n-}$ is an anion having a valency of n, n is an integer of 1 or greater, and x is 0.1 to 0.4;

compacting the raw material powder to obtain a compact;

firing the compact to obtain an oxide fired body;

retaining the oxide fired body in or immediately above an aqueous solution comprising an anion having a valency of n to reproduce the layered double hydroxide, thereby obtaining a water-rich layered double hydroxide solidified body; and removing excessive water from the water-rich layered double hydroxide solidified body.

DETAILED DESCRIPTION OF THE INVENTION

Layered Double Hydroxide Dense Body

Figure 1:
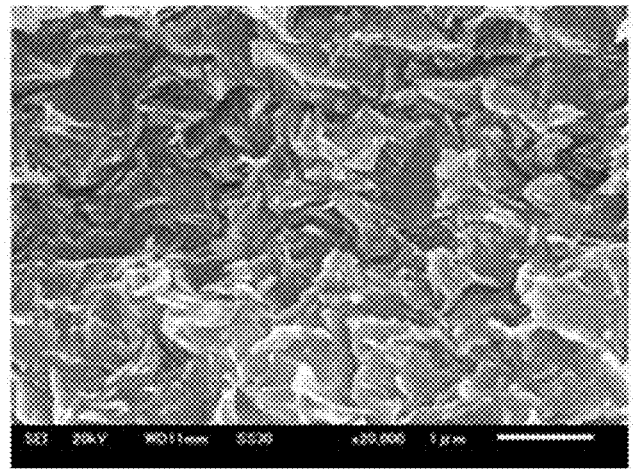
FIG. 1 is a secondary electron image obtained from SEM observation of the fracture surface of Sample 9 in Example 3.

The layered double hydroxide dense body of the present invention comprises as a main phase a layered double hydroxide represented by the general formula: $M^{2+}_{1-x}M^{3+}_{x}(OH)_2A^{n-}_{x/n} \cdot mH_2O$, wherein $M^{2+}$ is a divalent cation, $M^{3+}$ is a trivalent cation, $A^{n-}$ is an anion having a valency of n, n is an integer of 1 or greater, and x is 0.1 to 0.4. Preferably, the layered double hydroxide dense body consists essentially of (or consists of) the above layered double hydroxide.

In the general formula above, $M^{2+}$ may be any divalent cation, and preferable examples include $Mg^{2+}$, $Ca^{2+}$, and $Zn^{2+}$, with $Mg^{2+}$ being more preferable. $M^{3+}$ may be any trivalent cation, and preferable examples include $Al^{3+}$ and $Cr^{3+}$, with $Al^{3+}$ being more preferable. $A^{n-}$ may be any anion, and preferable examples include $OH^-$ and $CO_3^{2-}$. Accordingly, it is preferable that in the general formula above, at least $M^{2+}$ comprises $Mg^{2+}$, $M^{3+}$ comprises $Al^{3+}$, and $A^{n-}$ comprises $OH^-$ and/or $CO_3^{2-}$. The value of n is an integer of 1 or greater and is preferably 1 or 2. The value of x is 0.1 to 0.4 and is preferably 0.2 to 0.35.

The layered double hydroxide dense body of the present invention has a relative density of 88% or greater, preferably 90% or greater, and more preferably 94% or greater. A layered double hydroxide having such an extremely high relative density is sufficiently hermetic (gastight). In addition, such a dense body also has hydroxide ion conductivity, which is intrinsic to layered double hydroxides. Thus, in alkaline fuel cells and similar applications, enhancement of power generation performance can be expected while suppressing gas leakage due to porosity. Moreover, a novel use of a layered double hydroxide can be expected for, for example, a separator that can prevent zinc dentrite growth and carbon dioxide incorporation, which have been large technical barriers against forming a secondary zinc air battery in which an electrolytic solution is used. In view of these applications, it is preferable that the layered double hydroxide dense body of the present invention is substantially free from cracks, and more preferably the layered double hydroxide dense body is completely free from cracks.

It is preferable that in the layered double hydroxide dense body of the present invention, the layered double hydroxide main phase is composed of layered double hydroxide grains from which a clear endothermic peak is not observed at a temperature of 300° C. or less in a differential thermal analysis. This is because the clear endothermic peak mainly observed in the vicinity of 200° C. in a differential thermal analysis is said to be due to the elimination of interlayer water, it is thus thought that there is a large structural change such as a rapid change in interlayer distance accordingly, and it is inferred that the temperature range in which the layered double hydroxide is stable is possibly narrow.

It is preferable that the layered double hydroxide dense body of the present invention has a transparency as indicated by a linear transmittance of 20% or greater, more preferably 30% or greater, and even more preferably 40% or greater at 600 nm when both sides of the dense body are polished with a coated abrasive having a particle size of #8000 defined in JIS R 6001 (1998) such that the dense body has a thickness of 1 mm.

It is preferable that the layered double hydroxide dense body of the present invention has an anisotropic conductivity characterized in that the conductivity in a specific direction is greater than the conductivity in a direction perpendicular to the specific direction. In particular, when compaction is performed by pressing in a certain direction (e.g., by uniaxial pressing) to obtain a dense body, there is a tendency that the conductivity in a direction perpendicular to the direction of pressing (i.e., the direction parallel to the pressed surface) is greater than the conductivity in the direction of pressing (i.e., the direction perpendicular to the pressed surface). The conductivity at a temperature of 30° C. and a relative humidity of 90% in the specific direction (typically the direction perpendicular the direction of pressing) is preferably 0.1 mS/cm or greater, more preferably 0.5 mS/cm or greater, and even more preferably 1 mS/cm or greater when measured by the four-terminal method. When there is an anisotropic conductivity, the use of the layered double hydroxide dense body in such an orientation that the conductivity is higher makes the maximum level of conductivity available from the dense body. It is understood that such an anisotropic conductivity results from the fact that plate-like layered double hydroxide grains are oriented in the dense body.

Production Method

The layered double hydroxide dense body of the present invention may be prepared by any method, and one preferable embodiment of the production method is described below. This production method is performed by compacting and firing a raw material powder of a layered double hydroxide represented by hydrotalcite to obtain an oxide fired body, allowing the oxide fired body to reproduce the layered double hydroxide, and then removing excessive water. According to this method, a high-grade layered double hydroxide dense body having a relative density of 88% or greater can be provided and produced in a simple and stable manner.

(1) Provision of Raw Material Powder

A powder of a layered double hydroxide represented by general formula: $M^{2+}_{1-x} M^{3+}_{x}(OH)_2A^{n-}_{x/n} \cdot mH_2O$ (wherein $M^{2+}$ is a divalent cation, $M^{3+}$ is a trivalent cation, $A^{n-}$ is an anion having a valency of n, n is an integer of 1 or greater, and x is 0.1 to 0.4) is provided as a raw material powder. In the general formula above, $M^{2+}$ may be any divalent cation, and preferable examples include $Mg^{2+}$, $Ca^{2+}$, and $Zn^{2+}$, with $Mg^{2+}$ being more preferable. $M^{3+}$ may be any trivalent cation, and preferable examples include $Al^{3+}$ and $Cr^{3+}$, with $Al^{3+}$ being more preferable. $A^{n-}$ may be any anion, and preferable examples include $OH^-$ and $CO_3^{2-}$. Accordingly, it is preferable that in the general formula above, at least $M^{2+}$ comprises $Mg^{2+}$, $M^{3+}$ comprises $Al^{3+}$, and $A^{n-}$ comprises $OH^-$ and/or $CO_3^{2-}$. The value of n is an integer of 1 or greater and is preferably 1 or 2. The value of x is 0.1 to 0.4 and is preferably 0.2 to 0.35. Such a raw material powder may be a commercially available layered double hydroxide product or may be a raw material prepared by a known method such as liquid phase synthesis technique using nitrate or chloride. The particle size of the raw material powder is not limited as long as the desired layered double hydroxide dense body can be obtained, and the volume-based D50 average particle diameter is preferably 0.1 to 1.0 µm and more preferably 0.3 to 0.8 µm. This is because an excessively small particle diameter of the raw material powder is likely to result in aggregation of the powder, and it is highly possible that pores remain during compaction, while an excessively large particle diameter results in poor compactability.

Optionally, the raw material powder may be calcined to obtain an oxide powder. Although the calcination temperature at this stage is slightly different depending on the constituting $M^{2+}$ and $M^{3+}$, the calcination temperature is preferably 500° C. or less and more preferably 380 to 460° C., and calcination is performed in such a range that the particle diameter of the raw material does not largely change.

(2) Preparation of Compact

The raw material powder is compacted to obtain a compact. It is preferable that this compaction is performed by, for example, pressing such that the compact after compaction and before firing (hereinafter referred to as a compact) has a relative density of 43 to 65%, more preferably 45 to 60%, and even more preferably 47% to 58%. The relative density of the compact can be determined by calculating the density from the size and weight of the compact and dividing the density by the theoretical density, but since the weight of a compact is affected by adsorbed water, it is preferable to measure the relative density of a compact made from a raw material powder that has been stored for 24 hours or longer in a desiccator at room temperature at a relative humidity of 20% or less, or measure the relative density after storing the compact under the foregoing conditions, in order to obtain a precise value. When a raw material powder that has been calcined to form an oxide powder is used, the relative density of the compact is preferably 26 to 40% and more preferably 29 to 36%. In the case of using the oxide powder, the relative density was determined by using a calculated density obtained in terms of a mixture of oxides as a denominator, assuming that the metal elements constituting the layered double hydroxide had changed to their respective oxides due to calcination. Pressing, which is cited as an example, may be performed by metal-mold uniaxial pressing or may be performed by cold isostatic pressing (CIP). In the case of cold isostatic pressing (CIP), it is preferable to use a raw material powder that has been placed in a rubber container and vacuum-sealed or that has preliminarily compacted. In addition, the raw material powder may be compacted by a known method such as slip casting or extrusion molding, and the compacting method is not particularly limited. When a raw material powder that has been calcined to form an oxide powder is used, the compacting method is limited to dry compaction. The relative density of a compact from these methods influences not only the strength of the resulting dense body but also the degree of orientation of layered double hydroxide particles that usually have a plate shape, and it is therefore preferable to suitably adjust the relative density within the aforementioned range at the stage of compaction in consideration of, for example, the application thereof.

(3) Firing Step

The compact obtained in the foregoing step is fired to obtain an oxide fired body. It is preferable that this firing is performed such that the oxide fired body has a weight that is 57 to 65% of the weight of the compact and/or a volume that is 70 to 76% of the volume of the compact. When the weight is no less than 57% of the weight of the compact, a heterogeneous phase, from which a layered double hydroxide cannot be reproduced, is unlikely to be produced at the stage of reproduction of the layered double hydroxide, which is a subsequent step, and when the weight is no greater than 65%, firing is sufficient, and sufficient densification is achieved in a subsequent step. Also, when the volume is no less than 70% of the volume of the compact, neither a heterogeneous phase nor cracks are likely to appear at the stage of reproducing a layered double hydroxide, which is a subsequent step, and when the volume is no greater than 76%, firing is sufficient, and sufficient densification is achieved in a subsequent step. When the raw material powder that has been calcined to form an oxide powder is used, it is preferable to obtain an oxide fired body having a weight that is 85 to 95% of the weight of the compact and/or a volume that is no less than 90% of the volume of the compact. Irrespective of whether the raw material powder is calcined or not, it is preferable that firing is performed such that the oxide fired body has a relative density of 20 to 40% in terms of oxide, more preferably 20 to 35%, and even more preferably 20 to 30%. The relative density in terms of oxide is determined by using a calculated density obtained in terms of a mixture of oxides as a denominator, assuming that the metal elements constituting the layered double hydroxide have changed to their respective oxides due to firing. A preferable firing temperature for obtaining an oxide fired body is 400 to 850° C., and more preferably 700 to 800° C. It is preferable that the compact is retained at a firing temperature within this range for 1 hour or longer, and a more preferable retention time is 3 to 10 hours. In order to prevent the compact from cracking due to the release of water and carbon dioxide caused by rapid temperature increase, it is preferable to increase the temperature to the aforementioned firing temperature at a rate of 100° C./h or less, more preferably 5 to 75° C./h, and even more preferably 10 to 50° C./h. Accordingly, it is preferable to secure an overall firing time from temperature increase to temperature decrease (100° C. or less) of 20 hours or longer, more preferably 30 to 70 hours, and even more preferably 35 to 65 hours.

(4) Reproduction Step for Reproducing Layered Double Hydroxide

The oxide fired body obtained in the foregoing step is retained in or immediately above an aqueous solution comprising the above-described anion having a valency of n ($A^{n-}$) to reproduce a layered double hydroxide, thereby providing a water-rich layered double hydroxide solidified body. That is, the layered double hydroxide solidified body obtained by this production method inevitably contains excessive water. The anion contained in the aqueous solution may be the same anion as the anion contained in the raw material powder or may be a different anion. The retention of the oxide fired body in or immediately above the aqueous solution is preferably performed by a procedure of hydrothermal synthesis in a closed vessel, and an example of such a closed vessel is a closed vessel made from Teflon, more preferably a closed vessel equipped with a jacket made from stainless steel or the like. It is preferable that the formation of a layered double hydroxide is performed by retaining the oxide fired body at a temperature of 20° C. or greater and less than 200° C. in a state in which at least one surface of the oxide fired body is in contact with the aqueous solution, a more preferable temperature is 50 to 180° C., and an even more preferable temperature is 100 to 150° C. The oxide sintered body is retained at such a layered double hydroxide formation temperature preferably for 1 hour or longer, more preferably for 2 to 50 hours, and even more preferably for 5 to 20 hours. Such a retention time makes it possible to promote sufficient reproduction of a layered double hydroxide and avoid or reduce a remaining heterogeneous phase.

An excessively long retention time does not result in any particular problem, and the retention time is suitably set in view of efficiency.

When carbon dioxide (carbonate ions) in air is intended to be used as the anionic species of the aqueous solution comprising an anion having a valency of n used for the reproduction of a layered double hydroxide, it is possible to use ion exchanged water. When performing hydrothermal treatment in a closed vessel, the oxide fired body may be immersed in the aqueous solution, or treatment may be performed in such a state that at least one surface is in contact with the aqueous solution by using a jig. In the case where treatment is performed in a state in which at least one surface is in contact with the aqueous solution, the amount of excessive water is smaller than the amount required for complete immersion, and therefore the subsequent step may be performed in a shorter period of time. However, an excessively small amount of the aqueous solution is likely to result in cracks, and it is preferable to use water in an amount greater than or equal to the weight of the fired body.

(5) Dehydration Step

Excessive water is removed from the water-rich layered double hydroxide solidified body obtained in the foregoing step. In this way, the layered double hydroxide dense body of the present invention is obtained. It is preferable that this step of removing excessive water is performed in an environment having a temperature of 300° C. or less and an estimated relative humidity at the maximum temperature in the removal step of 25% or greater. In order to prevent rapid evaporation of water from the layered double hydroxide solidified body, it is preferable to charge the solidified body again into the closed vessel used in the reproduction step for reproducing the layered double hydroxide and remove water, in the case of dehydration at a temperature higher than room temperature. A preferable temperature in this case is 50 to 250° C. and more preferably 100 to 200° C. A more preferable relative humidity at the stage of dehydration is 25 to 70% and even more preferably 40 to 60%. Dehydration may be performed at room temperature, and there is no problem as long as the relative humidity in this case is within the range of 40 to 70% in an ordinary indoor environment.

EXAMPLES

The present invention will now be more specifically described by way of the following examples.

Example 1: Preparation of Layered Double Hydroxide Dense Body

Samples 1 to 35 that are hydrotalcite dense bodies, i.e., one type of layered double hydroxide, were prepared under the various conditions shown in Table 1. Specific procedures of preparing the samples are as follows.

(Samples 1 to 21, 29, 30, and 33 to 35)

A hydrotalcite powder (DHT-6, manufactured by Kyowa Chemical Industry Co., Ltd.) that is a commercially available layered double hydroxide was provided as a raw material powder. The composition of this raw material powder was $Mg^{2+}_{0.75}Al^{3+}_{0.25}(OH)_2CO_3^{n-}{}_{0.25/n} \cdot mH_2O$. The raw material powder was filled in a metal mold having a diameter of 16 mm and uniaxially pressed at the compacting pressures shown in Table 1 to obtain compacts having a relative density of 44 to 62% and a thickness of about 2 mm. Measurement of this relative density was performed on compacts that had been stored for 24 hours at room temperature and a relative humidity of 20% or less. The resulting compacts were fired in an alumina saggar. This firing was performed by increasing the temperature at a rate of 100° C./h or less in order to prevent the compacts from cracking due to the release of water and carbon dioxide caused by rapid temperature increase, retaining the compacts for 5 hours after reaching the maximum temperatures shown in Table 1, and then cooling the compacts. The overall firing time from this temperature increase to temperature decrease (100° C. or less) and the weight, volume, and relative density of the resulting sintered bodies were as shown in Table 1. The "weight" and "volume" in the "fired body" column in Table 1 were calculated as relative values (%), with the weight and volume of the pre-firing compact being 100%, and the "relative density" is determined in terms of oxide by using a theoretical density calculated by assuming that Mg and Al, which are constituent metal elements of hydrotalcite, were oxides. The fired bodies obtained in this way were charged together with ion exchanged water into a closed Teflon vessel equipped with a stainless steel jacket on its outside in air, and subjected to hydrothermal treatment under the reproduction conditions (temperature and retention time at that temperature) shown in Table 1 to obtain samples. Samples cooled to room temperature contain excessive water, and thus water on the surface was lightly wiped off with a filter paper or the like. The samples obtained in this way were subjected to spontaneous dehydration (drying) in a chamber having a temperature of 20 to 30° C. and a relative humidity of about 40 to 60% to obtain Samples 1 to 21, 29, 30, and 33 to 35.

(Samples 22 to 28)

Samples 22 to 28 were prepared in the same manner as Sample 9 except that a dehydration step, which will be described below, was performed in place of spontaneous dehydration (drying). That is, this dehydration step was performed by charging a hydrotalcite sample from which water on the surface had been lightly wiped off again into the closed Teflon vessel equipped with a stainless steel jacket on its outside, performing hydrothermal treatment at the temperature and relative humidity shown in Table 1, and cooling the sample to room temperature. When a decrease of the estimated value of the relative humidity in the vessel at the treatment temperature was expected, a secondary material capable of humidity adjustment was also charged as necessary. Table 1 shows the relative humidity at the maximum temperature, and the relative humidity was calculated in the following manner: the difference obtained by subtracting the pre-firing weight from the weight of the reproduced hydrotalcite sample was presumed to correspond to the water vapor in the vessel, the water vapor partial pressure was calculated from the amount of water and the volume of the vessel, and the water vapor partial pressure was divided by the saturated water vapor pressure at the treatment temperature.

(Sample 30)

Sample 30 was prepared in the same manner as Sample 9 except that a commercially available hydrotalcite powder with a different x value (DHT-4H, manufactured by Kyowa Chemical Industry Co., Ltd.) (composition: $Mg^{2+}_{0.68}Al^{3+}_{0.32}(OH)_2CO_3^{n-}{}_{0.25/n} \cdot mH_2O$) was used as a raw material powder.

(Sample 31—Comparative)

Sample 31 was prepared in the same manner as Sample 9 except that the compacting pressure was 3000 kgf/cm², and firing and the subsequent steps were not performed.

(Sample 32—Comparative)

Sample 32 was prepared in the same manner as Sample 9 except that the compacting pressure was 3000 kgf/cm².

Example 2: Measurement of Relative Density

The density was calculated from the size and weight of each of Samples 1 to 35, and this density was divided by the theoretical density to determine the relative density. The value of 2.06 g/cm$^3$ as provided in JCPDS Card No. 22-0700 was used for the theoretical density of hydrotalcite with Mg/Al=3, and the value of 2.09 g/cm$^3$ as provided in JCPDS Card No. 70-2151 was used for the theoretical density of hydrotalcite with Mg/Al=2. Results were as shown in Table 1.

Example 3: Observation of Cross-Sectional Microstructure

Figure 2:
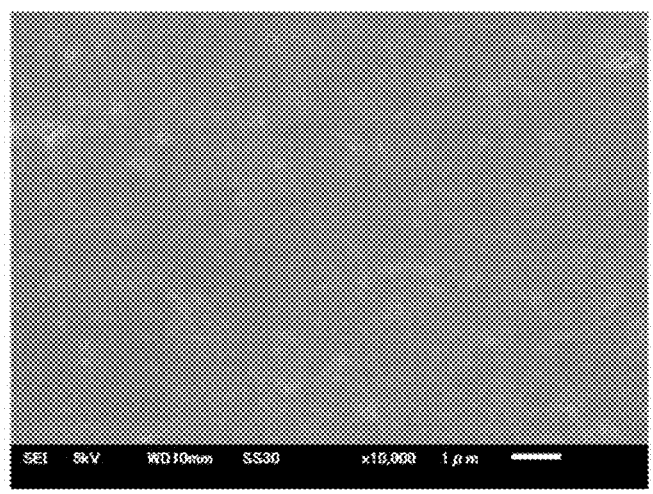
FIG. 2 is a secondary electron image obtained from SEM observation of the polished cross-sectional surface of Sample 3 in Example 3.
Figure 3:
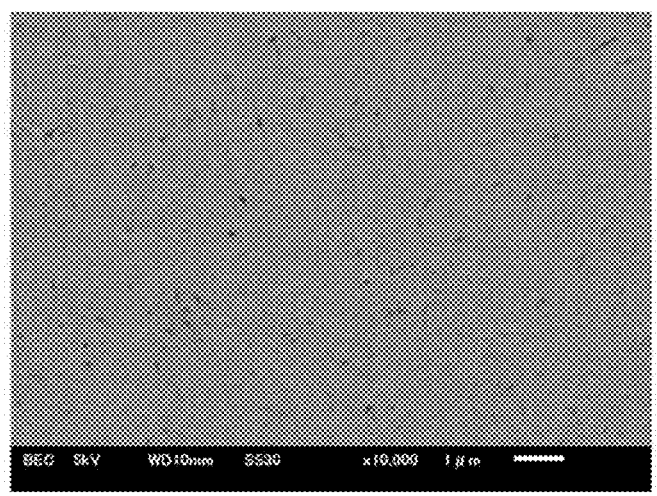
FIG. 3 is a reflection electron image obtained from SEM observation of the polished cross-sectional surface of Sample 3 in Example 3.

The fracture surface or polished surface of Samples 3 and 9 was observed using a scanning electron microscope (SEM, JSM-6610LV, manufactured by JEOL) with an accelerating voltage of 5 to 20 kV. FIG. 1 shows a secondary electron image obtained from the observation of the fracture surface of Sample 9. FIGS. 2 and 3 show a secondary electron image and a reflection electron image, respectively, obtained from the observation of the polished cross-sectional surface of Sample 3. In the reflection electron image of FIG. 3, the black portions having a size of 0.1 μm or less are presumed to be pores, and it can be understood that the sample is sufficiently dense.

Example 4: Evaluation of Cracks

Samples 1 to 35 were visually observed, and the presence or absence of cracks and the extent of cracks were assessed in accordance with the following criteria. Also, the presence or absence of cracks and the extent of cracks in samples after hydrotalcite formation and before dehydration were assessed in accordance with similar criteria. Results were as shown in Table 1.
A: No cracks were visually observed
B: There were very slight cracks in the peripheral part and the like, but not problematic once the cracked portions of the specimen were shaved off
C: There were a small amount of cracks in the peripheral part and the like, but there were no such cracks as penetrating cracks, and not problematic once the cracked portions of the specimen were shaved off
D: Specimen was reduced to pieces having a diameter of roughly 2 mm or less

Example 5: Identification of Crystal Phase

The crystal phases of the samples of Examples 1 to 35 were evaluated with an X-ray diffractometer (D8 ADVANCE, manufactured by Bulker AXS) under measurement conditions of a voltage: 40 kV, a current value: 40 mA, and a measurement range: 5 to 70°, identified using the diffraction peaks of hydrotalcite as provided in JCPDS Card NO. 35-0965, and assessed in accordance with the following criteria. Results were as shown in Table 1. Also, some examples of XRD profiles obtained by the measurement are shown in FIGS. 4 to 7.
A: Only the peaks resulting from hydrotalcite were observed.
B: Other than the peaks resulting from hydrotalcite, peaks resulting from a heterogeneous phase were slightly observed.
C: Other than the peaks resulting from hydrotalcite, peaks resulting from a heterogeneous phase were clearly observed.
D: No peaks resulting from hydrotalcite were observed.

Figure 4:
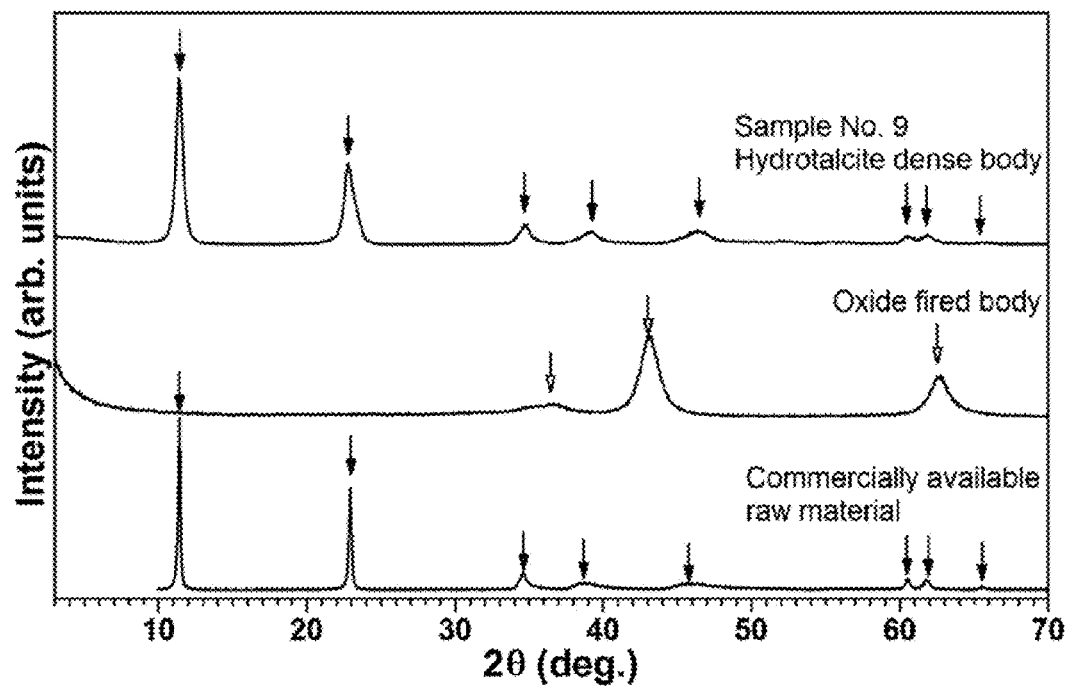
FIG. 4 is a diagram showing the changes in XRD profile of Sample 9, obtained in Example 5, from commercially available hydrotalcite (bottom), which is a raw material powder, through an oxide sintered body (middle), to a hydrotalcite dense body (top).

FIG. 4 shows the changes in XRD profile from commercially available hydrotalcite (bottom), which is a raw material powder, through an oxide sintered body (middle), to a hydrotalcite dense body (top) with respect to Sample 9. The commercially available hydrotalcite and the hydrotalcite dense body were identified based on JCPDS Card No. 35-0965. The oxide fired body was identified based on JCPDS Card No. 87-0653 concerning MgO. The peak positions of the oxide sintered body in FIG. 4 are not completely identical to the peak positions provided in the JCPDS Card concerning MgO, and this is presumably because Al forms a solid solution with MgO.

Figure 5:
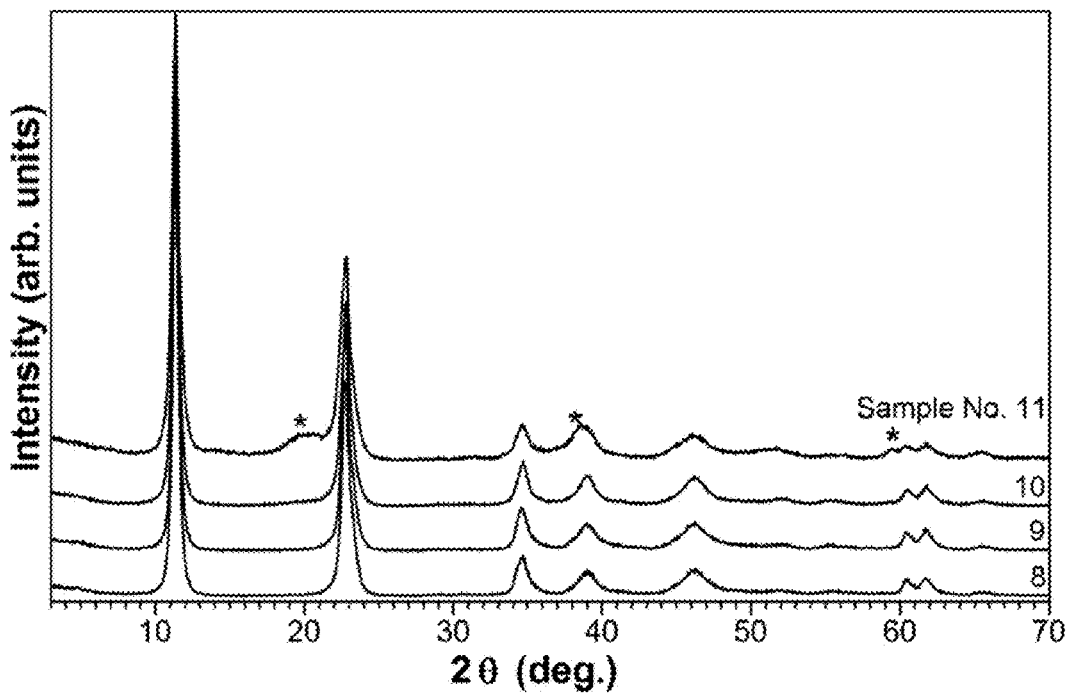
FIG. 5 is a diagram showing the XRD profiles of Samples 8 to 11, obtained in Example 5, prepared through different firing temperatures.

FIG. 5 shows the XRD profiles of Samples 8 to 11 prepared through different firing temperatures. That is, the firing temperatures employed in the production of Samples 8, 9, 10, and 11 are 700° C., 750° C., 800° C., and 850° C., respectively. In FIG. 5, peaks (peaks indicated by * in the diagram) resulting from a heterogeneous phase that is presumably Mg(OH)$_2$ were slightly observed from Sample 11 prepared thorough the highest firing temperature of 850° C. among these samples, and thus Sample 11 was rated as "B" in accordance with the above-described criteria. It is considered that there is a possibility that Al forms a solid solution in this heterogeneous phase.

Figure 6:
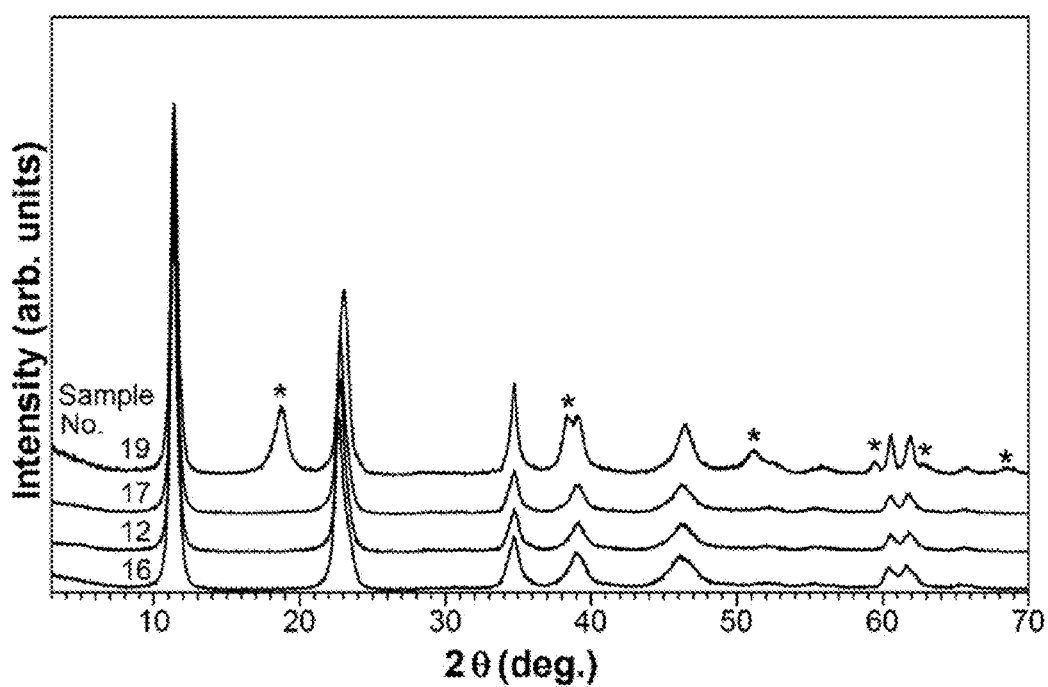
FIG. 6 is a diagram showing the XRD profiles of Samples 12, 16, 17, and 19, obtained in Example 5, prepared through different reproduction temperatures for reproducing layered double hydroxide.
Figure 7:
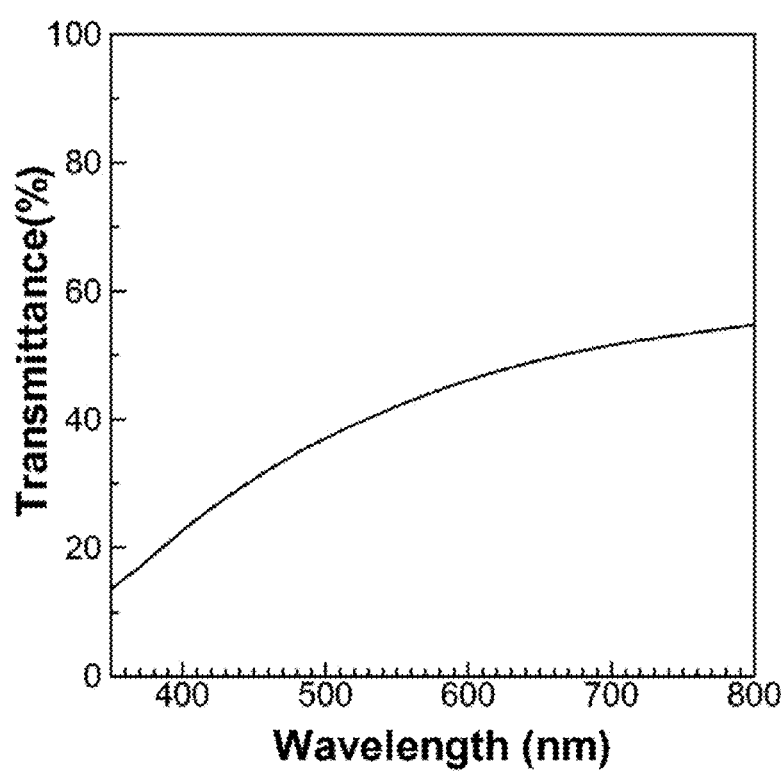
FIG. 7 is the linear transmittance curve of Sample 9 measured in Example 6.

FIG. 6 shows the XRD profiles of Samples 12, 16, 17, and 19 prepared through different reproduction temperatures for reproducing hydrotalcite. The reproduction temperatures employed in the production of Samples 12, 16, 17, and 19 are 100° C., 50° C., 150° C., and 200° C., respectively. In FIG. 6, peaks (peaks indicated by * in the diagram) resulting from a heterogeneous phase that is presumably Mg(OH)$_2$ were clearly observed from Sample 19 prepared thorough the highest firing temperature of 200° C. among these samples, and Sample 19 was thus rated as "C" in accordance with the above-described criteria. It is considered that there is a possibility that Al forms a solid solution in this heterogeneous phase.

Example 6: Measurement of Linear Transmittance

Figure 8:
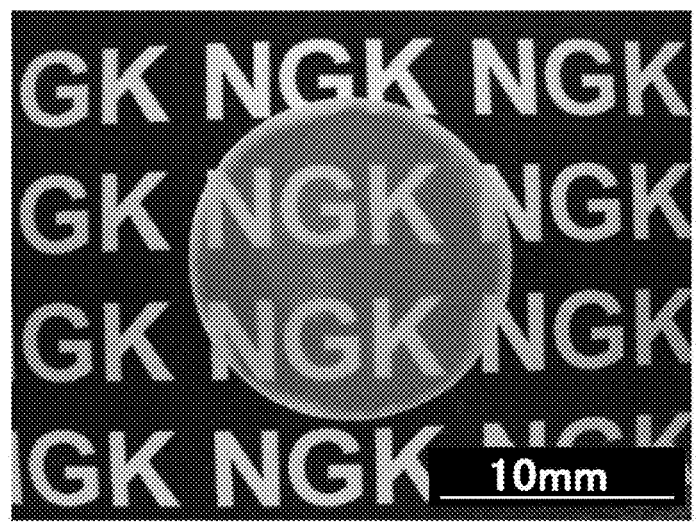
FIG. 8 is a photograph showing a top view of Sample 9 (a thickness of 1 mm) placed on a printed substrate surface, taken in Example 6.
Figure 9:
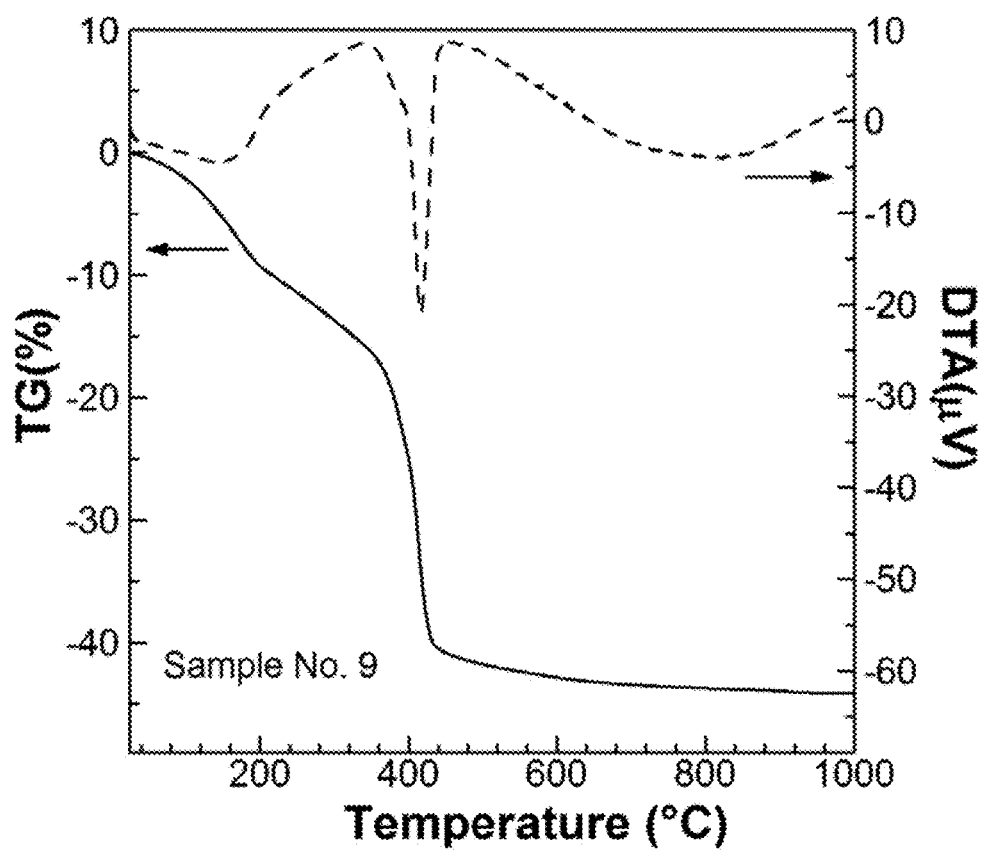
FIG. 9 shows the TG-DTA result of Sample 9 obtained in Example 7.

Both surfaces of Samples 7 to 9 and 31 were polished with an abrasive paper having a particle size of #8000 defined in JIS R 6001 (1998) to obtain test specimens having a thickness of 1 mm (±0.05 mm). The linear transmittances at 350 to 800 nm of the test specimens were measured with a UV/VIS spectrophotometer (Lambda 900, manufactured by Perkin Elmer). The linear transmittances of Samples 7 to 9 and 31 measured at 600 nm are shown in Table 1. The linear transmittance curve of Sample 9 measured at 350 to 800 nm is shown in FIG. 8. Sample 9 (a thickness of 1 mm) was placed on a printed substrate and the top view was observed, and Sample 9 had such translucency that it was possible to see the characters on the substrate through the sample as shown in the photograph of FIG. 9. In the linear transmittance measurement shown in FIG. 8 as well, it can be understood that Sample 9 has a transmittance of 40% or greater with respect to red light at 600 nm.

Example 7: Differential Thermal Analysis and Thermogravimetric Measurement

Figure 10:
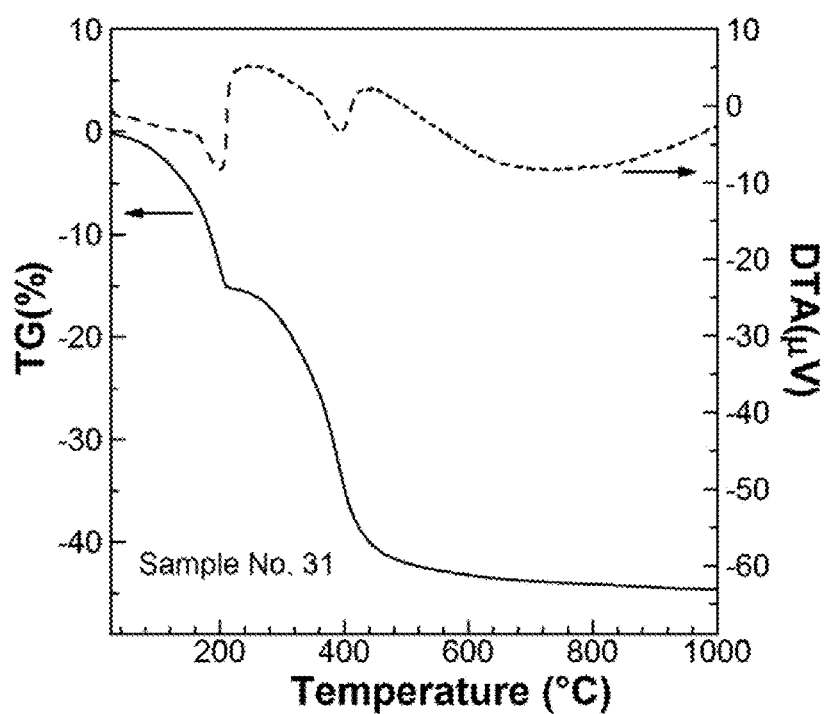
FIG. 10 shows the TG-DTA result of Sample 31 obtained in Example 7.

A differential thermal analysis and a thermogravimetric measurement (hereinafter referred to as TG-DTA) were performed on Samples 9 and 31 with a differential thermal balance (Thermo plus EVO, manufactured by Rigaku Corporation). This TG-DTA was performed at a temperature increase rate of 3° C./min in a temperature range of up to 1000° C. The TG-DTA results of Samples 9 and 31 are shown in FIGS. 9 and 10, respectively. There was a difference that Sample 31, which is a comparative embodiment, had a sharp endothermic peak also at about 200° C. in FIG. 10, while Sample 9, which is an embodiment of the present invention, barely had such a peak in FIG. 9, and had a large, sharp endothermic peak at about 400° C. instead. It is presumed that this difference suggests that the situations of interlayer water, condensation dehydration of hydroxyl groups existing between layers, and decarbonation are markedly different between the sample prepared by the method of the present invention and the sample prepared by a different method.

Example 8: X-Ray Diffraction

Figure 11:
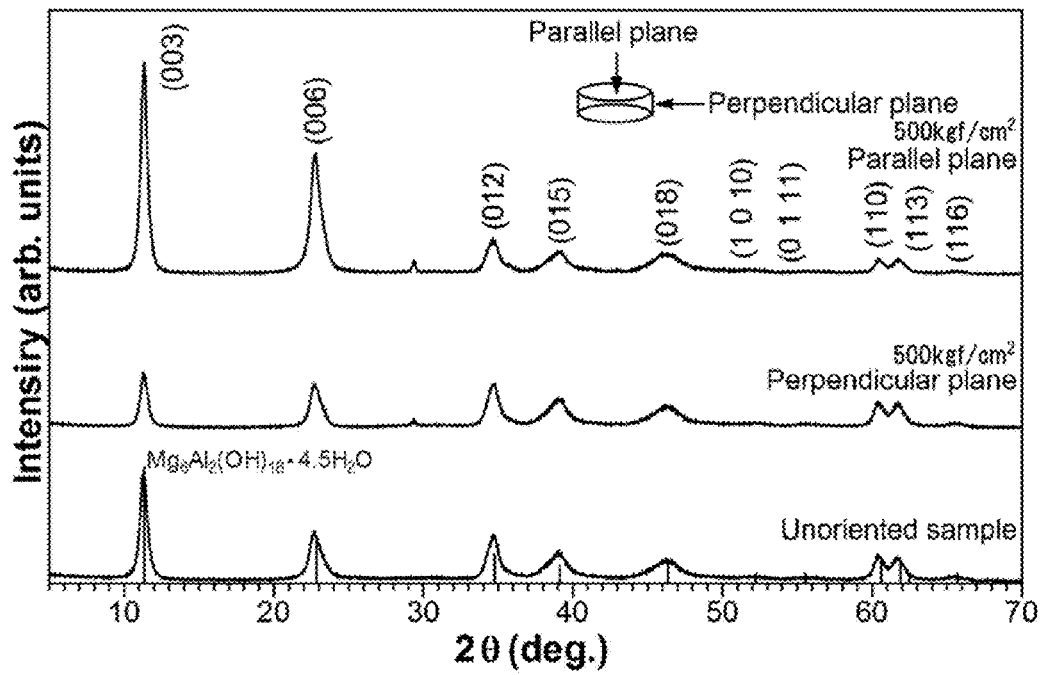
FIG. 11 is a diagram showing the XRD profiles of Sample 9 (an oriented sample) and an unoriented sample obtained in Example 8.

X-ray diffraction was performed on Sample 9 in the directions parallel and perpendicular to the direction of uniaxial pressing performed at the stage of compaction, and the XRD profiles shown in FIG. 11 were obtained. The XRD profile of an unoriented sample is also shown in FIG. 11. This unoriented sample was obtained by placing a raw material powder in a rubber container and vacuum-sealing it, then performing cold isostatic pressing (CIP) for compaction, and performing post-compaction processes in the same manner as Sample 9. As shown in FIG. 11, peaks having nearly the same peak intensities as provided in the information in the card were recognized from the unoriented sample. Compared with this unoriented sample, intense (003) and (006) peaks were observed at the parallel planes of Sample 9 (planes parallel to the pressed surface), but the (003) and (006) peak intensities at the perpendicular planes (planes perpendicular to the pressed surface) were weak. From these results, it is recognized that plate-shaped particles are oriented in the dense body of Sample 9.

Example 9: Measurement of Conductivity

Figure 12:
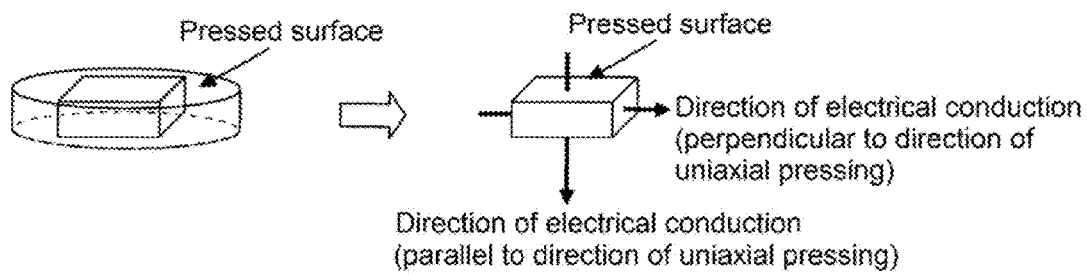
FIG. 12 is a diagram for explaining conductivity measurement by the two-terminal method in Example 9.
Figure 13:
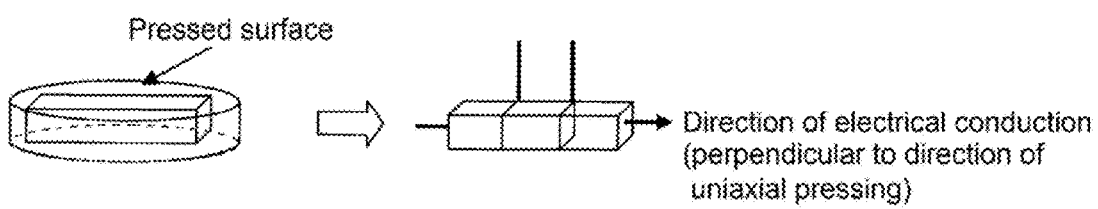
FIG. 13 is a diagram for explaining conductivity measurement by the four-terminal method in Example 9.

The conductivities of Samples 3, 6, and 9 prepared through uniaxial pressing under various compacting pressures were measured in the following manner. In the following description, the term "parallel" means to be parallel to the direction of uniaxial pressing performed at the stage of compaction (i.e., perpendicular to the pressed surface), and "perpendicular" means to be perpendicular to the direction of pressing (i.e., parallel to the pressed surface). As shown in FIGS. 12 and 13, the conductivity measurement was performed by cutting out measurement specimens from Samples 3, 6, and 9 and measuring their conductivities by the two-terminal method and/or four-terminal method. The four-terminal method enables more precise measurement of the conductivity of a sample itself by eliminating other resisting factors of the measurement system, but there are various limitations, for example, requiring a sample to have a certain thickness, and therefore the conductivity of Sample 3 was assessed only by the two-terminal method for convenience, and the relative conductivity difference from Samples 6 and 9 on which measurement was performed also by the two-terminal method was assessed. Then, more accurate conductivities of Samples 6 and 9 were measured by the four-terminal method. Specific procedures of the two-terminal method and four-terminal method are as follows.

(Two-Terminal, Parallel/Perpendicular)

As shown in FIG. 12, an electrode was formed on each end face of Samples 3, 6, and 9 from Pt paste, and parallel/perpendicular directions were determined according to the direction of electrical conduction. The measurement was performed by an alternating current impedance method using Models 1287 and 1260 manufactured by Solartron. The measurement was performed in a constant temperature/humidity chamber in an environment having a temperature of 30 to 85° C. and a relative humidity of 90%, with the AC voltage amplitude being 100 mV and the measuring frequency range being 0.1 to 1 MHz. The results of the measurement at 30° C. are shown in Table 2. From the measurement in which the temperature was changed in a range of 30 to 85° C., it was found that the activation energy was within the range of 0.2 to 0.4 eV.

(Four-Terminal, Perpendicular)

As shown in FIG. 13, current-introducing terminals were formed from Pt-supported carbon cloth and nickel foam on both longitudinal end faces (the surfaces perpendicular to the pressed surface) of Samples 6 and 9, and voltage terminals were formed from Pt wire near the central part of each sample. The measurement was performed by a direct current method and an alternating current impedance method using Models 1287 and 1260 manufactured by Solartron. The measurement was performed in a constant temperature/humidity chamber in an environment having a temperature of 30 to 85° C. and a relative humidity of 90%. In the direct current method, sweeping was performed at a voltage of −0.3 to 0.3 V, and in the alternating current impedance method, the AC voltage amplitude was 100 mV, and the measuring frequency range was from 0.1 to 1 MHz. The same conductivity was measured by both the direct current method and the alternating current impedance method. The results of the measurement at 30° C. are shown in Table 2. As can be understood from Tables 1 and 2, Sample 9 prepared at the highest compacting pressure (500 kgf/cm$^2$) among the measurement samples achieved a very high conductivity of 4.6 mS/cm. From the measurement in which the temperature was changed in a range of 30 to 85° C., it was found that the activation energy was within the range of 0.2 to 0.4 eV.

[Table 1]

TABLE 1

| | Compacting condition | | Firing condition | | | | | Reproduction condition | | | Dehydration condition | |
| | | | | Overall | | Fired body | | | | | | |
| Sample No. | Compacting pressure (kgf/cm$^2$) | Relative density (%) | Maximum temperature (° C.) | firing time (h) | Weight (%) | Volume (%) | Relative density (%) | Temperature (° C.) | Retention time (h) | Crack | Temperature (° C.) | Relative humidity (%) |
| 1 | 100 | 44 | 750 | 62 | 59 | 76 | 20 | 100 | 5 | C | RT | — |
| 2 | 200 | 48 | 700 | 60 | 62 | 74 | 22 | 100 | 5 | A | RT | — |
| 3 | 200 | 47 | 750 | 62 | 59 | 73 | 21 | 100 | 5 | A | RT | — |
| 4 | 200 | 47 | 800 | 64 | 59 | 74 | 21 | 100 | 5 | A | RT | — |

TABLE 1-continued

| | Compacting condition | | Firing condition | | Fired body | | | Reproduction condition | | | Dehydration condition | |
|---|---|---|---|---|---|---|---|---|---|---|---|---|
| | | | | Overall | | | | | | | | |
| Sample No. | Compacting pressure (kgf/cm²) | Relative density (%) | Maximum temperature (°C.) | firing time (h) | Weight (%) | Volume (%) | Relative density (%) | Temperature (°C.) | Retention time (h) | Crack | Temperature (°C.) | Relative humidity (%) |
| 5 | 300 | 51 | 700 | 60 | 62 | 73 | 24 | 100 | 5 | A | RT | — |
| 6 | 300 | 50 | 750 | 62 | 59 | 72 | 23 | 100 | 5 | A | RT | — |
| 7 | 300 | 50 | 800 | 64 | 59 | 73 | 22 | 100 | 5 | A | RT | — |
| 8 | 500 | 55 | 700 | 60 | 62 | 73 | 26 | 100 | 5 | A | RT | — |
| 9 | 500 | 56 | 750 | 62 | 59 | 72 | 25 | 100 | 5 | A | RT | — |
| 10 | 500 | 55 | 800 | 64 | 59 | 72 | 24 | 100 | 5 | A | RT | — |
| 11 | 500 | 55 | 850 | 66 | 58 | 71 | 24 | 100 | 5 | A | RT | — |
| 12 | 500 | 55 | 750 | 38 | 60 | 72 | 23 | 100 | 5 | A | RT | — |
| 13 | 500 | 56 | 750 | 38 | 60 | 72 | 23 | 20 | 20 | A | RT | — |
| 14 | 500 | 56 | 750 | 17 | 63 | 72 | 24 | 100 | 5 | A | RT | — |
| 15 | 500 | 55 | 750 | 62 | 59 | 72 | 23 | 100 | 50 | A | RT | — |
| 16 | 500 | 56 | 750 | 38 | 60 | 72 | 23 | 50 | 5 | A | RT | — |
| 17 | 500 | 56 | 750 | 38 | 60 | 72 | 24 | 150 | 5 | A | RT | — |
| 18 | 500 | 56 | 750 | 38 | 60 | 72 | 23 | 180 | 5 | A | RT | — |
| 19 | 500 | 56 | 750 | 38 | 60 | 72 | 23 | 200 | 2 | A | RT | — |
| 20 | 500 | 55 | 750 | 62 | 59 | 72 | 23 | 100 | 2 | A | RT | — |
| 21 | 500 | 55 | 750 | 62 | 59 | 72 | 24 | 100 | 20 | A | RT | — |
| 22 | 500 | 55 | 750 | 62 | 59 | 72 | 24 | 100 | 5 | A | 5 | 10 |
| 23 | 500 | 55 | 750 | 62 | 59 | 72 | 25 | 100 | 5 | A | 100 | 100 |
| 24 | 500 | 56 | 750 | 62 | 59 | 72 | 26 | 100 | 5 | A | 150 | 26 |
| 25 | 500 | 55 | 750 | 62 | 59 | 72 | 25 | 100 | 5 | A | 180 | 44 |
| 26 | 500 | 56 | 750 | 62 | 59 | 72 | 26 | 100 | 5 | A | 200 | 32 |
| 27 | 500 | 55 | 750 | 62 | 59 | 72 | 26 | 100 | 5 | A | 250 | 12 |
| 28 | 500 | 55 | 750 | 62 | 59 | 72 | 26 | 100 | 5 | A | 250 | 46 |
| 29 | 1000 | 62 | 750 | 62 | 59 | 72 | 30 | 100 | 5 | B | RT | — |
| 30 | 500 | 53 | 750 | 62 | 59 | 72 | 23 | 100 | 5 | A | RT | — |
| 31 (Comp.) | 3000 | 79 | — | — | — | — | — | — | — | — | — | — |
| 32 (Comp.) | 3000 | 79 | 750 | 62 | 59 | 87 (cracked) | 41 | 100 | 5 | C | RT | — |
| 33 | 500 | 55 | 400 | 52 | 65 | 73 | 26 | 100 | 5 | A | RT | — |
| 34 | 500 | 55 | 500 | 55 | 63 | 73 | 25 | 100 | 5 | A | RT | — |
| 35 | 500 | 55 | 600 | 58 | 62 | 72 | 25 | 100 | 5 | A | RT | — |

[Table 2]

TABLE 2

| | Hydrotalcite dense body | | | | | | |
|---|---|---|---|---|---|---|---|
| | | | | 600 nm | Conductivity (mS/cm) | | |
| Sample No. | Relative density (%) | Crack | Crystalline phase | linear transmittance (%) | Two-terminal parallel | Two-terminal perpendicular | Four-terminal perpendicular |
| 1 | 90 | C | A | — | — | — | — |
| 2 | 93 | A | A | — | — | — | — |
| 3 | 92 | A | A | — | 0.0079 | — | 0.25 |
| 4 | 93 | A | A | — | — | — | — |
| 5 | 94 | A | A | — | — | — | — |
| 6 | 94 | A | A | — | 0.0025 | — | — |
| 7 | 95 | A | A | 47 | — | — | — |
| 8 | 94 | A | A | 46 | — | — | — |
| 9 | 95 | A | A | 46 | 0.0017 | 0.053 | 4.6 |
| 10 | 94 | A | A | — | — | — | — |
| 11 | 92 | A | B | — | — | — | — |
| 12 | 94 | A | A | — | — | — | — |
| 13 | 91 | A | A | — | — | — | — |
| 14 | 88 | A | A | — | — | — | — |
| 15 | 89 | A | A | — | — | — | — |
| 16 | 90 | A | A | — | — | — | — |
| 17 | 92 | A | A | — | — | — | — |
| 18 | 93 | A | A | — | — | — | — |
| 19 | 95 | A | C | — | — | — | — |
| 20 | 93 | A | A | — | — | — | — |
| 21 | 91 | A | A | — | — | — | — |
| 22 | 93 | C | A | — | — | — | — |
| 23 | 95 | A | A | — | — | — | — |
| 24 | 94 | A | A | — | — | — | — |
| 25 | 95 | A | A | — | — | — | — |

TABLE 2-continued

| | Hydrotalcite dense body | | | | | | |
|---|---|---|---|---|---|---|---|
| | Relative | | | 600 nm | Conductivity (mS/cm) | | |
| Sample No. | density (%) | Crack | Crystalline phase | linear transmittance (%) | Two-terminal parallel | Two-terminal perpendicular | Four-terminal perpendicular |
| 26 | 95 | A | B | — | — | — | — |
| 27 | 95 | A | B | — | — | — | — |
| 28 | 95 | A | A | — | — | — | — |
| 29 | 95 | C | A | — | — | — | — |
| 30 | 91 | A | A | — | — | — | — |
| 31 (Comp.) | 79 | A | A | 0 | — | — | — |
| 32 (Comp.) | 87 | C | A | — | — | — | — |
| 33 | 89 | C | A | — | — | — | — |
| 34 | 88 | C | A | — | — | — | — |
| 35 | 89 | C | A | — | — | — | — |

What is claimed is:

1. A layered double hydroxide dense body comprising a layered double hydroxide as a main phase and having a relative density of 88% or greater, the layered double hydroxide being represented by the general formula:

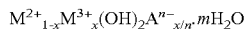
$M^{2+}_{1-x}M^{3+}_{x}(OH)_2A^{n-}_{x/n} \cdot mH_2O$ wherein $M^{2+}$ is a divalent cation, $M^{3+}$ is a trivalent cation, $A^{n-}$ is an anion having a valency of n, n is an integer of 1 or greater, x is 0.1 to 0.4, and m is any integer greater than 0, wherein the relative density of the body is determined by dividing the density of the body calculated from the size and weight of the body by the theoretical density of the body,
wherein the body has an anisotropic conductivity characterized in that conductivity in a specific direction is greater than conductivity in a direction perpendicular to the specific direction, and
wherein the main phase is composed of layered double hydroxide grains from which a clear endothermic peak is not observed at a temperature of 300° C. or less in a different thermal analysis.

2. The layered double hydroxide dense body according to claim 1, wherein the relative density is 90% or greater.

3. The layered double hydroxide dense body according to claim 1, consisting essentially of the layered double hydroxide.

4. The layered double hydroxide dense body according to claim 1, wherein in the general formula, at least $M^{2+}$ comprises $Mg^{2+}$, $M^{3+}$ comprises $Al^{3+}$, and $A^{n-}$ comprises $OH^-$ and/or $CO_3^{2-}$.

5. The layered double hydroxide dense body according to claim 1, which has a transparency as indicated by a linear transmittance of 20% or greater at 600 nm when both sides of the dense body are polished with a coated abrasive having a particle size of #8000 defined in JIS R 6001 (1998) such that the dense body has a thickness of 1 mm.

6. The layered double hydroxide dense body according to claim 1, which is free from cracks.

7. The layered double hydroxide dense body according to claim 1, wherein the conductivity in the specific direction is 0.1 mS/cm or greater when measured by a four-terminal method at a temperature of 30° C. and a relative humidity of 90%.

8. A method for producing a layered double hydroxide dense body, comprising the steps of:
providing a raw material powder of a layered double hydroxide represented by the general formula:

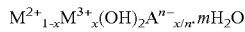
$M^{2+}_{1-x}M^{3+}_{x}(OH)_2A^{n-}_{x/n} \cdot mH_2O$ wherein $M^{2+}$ is a divalent cation, $M^{3+}$ is a trivalent cation, $A^{n-}$ is an anion having a valency of n, n is an integer of 1 or greater, and x is 0.1 to 0.4 and m is any integer greater than 0;
compacting the raw material powder to obtain a compact, wherein the compaction is performed such that the compact has a relative density of 43 to 65%;
firing the compact to obtain an oxide fired body;
retaining the oxide fired body in or immediately above an aqueous solution comprising an anion having a valency of n to reproduce the layered double hydroxide, thereby obtaining a water-rich layered double hydroxide solidified body; and
removing excessive water from the water-rich layered double hydroxide solidified body, wherein the dense body comprises the layered double hydroxide as a main phase and having a relative density of 88% or greater, and the relative density is determined by dividing the density of the body calculated from the size and weight of the body by the theoretical density of the body,
wherein the body has an anisotropic conductivity characterized in that conductivity in a specific direction is greater than the conductivity in a direction perpendicular to the specific direction, and
wherein the main phase is composed of layered double hydroxide grains from which a clear endothermic peak is not observed at a temperature of 300° C. or less in a different thermal analysis.

9. The method according to claim 8, wherein the compaction is performed at a pressure of 100 kgf/cm² or greater and less than 1000 kgf/cm².

10. The method according to claim 8, wherein the firing is performed such that the oxide fired body has a weight that is 57 to 65% of the weight of the compact and/or a volume that is 70 to 76% of the volume of the compact.

11. The method according to claim 8, wherein the firing is performed such that the oxide fired body has a relative density of 20 to 40% in terms of oxide.

12. The method according to claim 8, wherein the firing is performed at a temperature of 700 to 800° C.

13. The method according to claim 8, wherein the reproduction of the layered double hydroxide is performed by retaining the oxide fired body at a temperature of 20° C. or greater and less than 200° C. in a state in which at least one surface of the oxide fired body is in contact with the aqueous solution.

14. The method according to claim 8, wherein the step of removing excessive water is performed in an environment having a temperature of 300° C. or less and a relative humidity of 25% or greater.

15. The method according to claim 8, further comprising the step of calcining the raw material powder at a temperature of 500° C. or less to obtain an oxide powder before the compaction.

* * * * *